US008570561B2

(12) United States Patent
Ikeura

(10) Patent No.: US 8,570,561 B2
(45) Date of Patent: Oct. 29, 2013

(54) IMAGE FORMING APPARATUS, PRINTING CONTROL METHOD, AND COMPUTER-READABLE RECORDING MEDIUM THEREOF

(75) Inventor: Ryuichi Ikeura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 988 days.

(21) Appl. No.: 12/636,834

(22) Filed: Dec. 14, 2009

(65) Prior Publication Data

US 2010/0165388 A1 Jul. 1, 2010

(30) Foreign Application Priority Data

Dec. 26, 2008 (JP) ................................. 2008-333731

(51) Int. Cl.
*G06F 15/00* (2006.01)

(52) U.S. Cl.
USPC ............................ 358/1.15; 358/1.1; 358/1.13

(58) Field of Classification Search
USPC ................................................ 358/1.1, 1.15
See application file for complete search history.

(56) References Cited

U.S. PATENT DOCUMENTS

| 6,775,729 B1 * | 8/2004 | Matsuo et al. ............... 710/263 |
| 2007/0242286 A1 * | 10/2007 | Heo ............................... 358/1.6 |
| 2009/0077164 A1 | 3/2009 | Phillips et al. |
| 2009/0077169 A1 | 3/2009 | Ikeura et al. |
| 2009/0168100 A1 * | 7/2009 | Huster ......................... 358/1.15 |

FOREIGN PATENT DOCUMENTS

| JP | 2003182189 | * | 3/2003 |
| JP | 2003-108345 | | 4/2003 |
| JP | 2003-182189 | | 7/2003 |

OTHER PUBLICATIONS

English Machine translation of JP 2003182189.*
Japanese Office Action dated Jan. 15, 2013.

* cited by examiner

*Primary Examiner* — King Poon
*Assistant Examiner* — Iriana Cruz
(74) *Attorney, Agent, or Firm* — IPUSA, PLLC

(57) ABSTRACT

An image forming apparatus connected to a network and including a storage part, a printing request receiving part for receiving a printing request from a data processing apparatus via the network and recording the printing request in the storage part, the printing request including a page description language list indicating at least one page description language applicable to the data processing apparatus, a determining part for determining whether the data processing apparatus is to convert electronic data associated to the printing request into printing data based on whether the page description language list includes a page description language processable by the image forming apparatus, a data obtaining part for transmitting first and second requests to the data processing apparatus and receiving the printing data or the electronic data in response to the first and second request; and a printing part for printing data obtained from the data obtaining part.

12 Claims, 16 Drawing Sheets

FIG.7

| APPLICATION ID | print001 |
| --- | --- |
| USER ID | USER A |
| COOPERATION FUNCTION IDENTIFIER | print |
| NETWORK APPLICATION ADDRESS | http://xxx/xxx/xxx |
| DISPLAY NAME | PRINTING FILE A |
| PRINTING SETTING DATA | ... |
| FILE NAME | FILE A |
| FILE FORMAT | word |
| PDL LIST | ... |

FIG.9

| USER ID | URL FOR OBTAINING APPLICATION DATA 126 |
|---|---|
| USER A | http://xxxxxxx |
| USER B | ... |
| | |

FIG.12

| APPLICATION ID | print001 |
|---|---|
| USER ID | USER A |
| COOPERATION FUNCTION IDENTIFIER | print |
| NETWORK APPLICATION ADDRESS | http://xxx/xxx/xxx |
| DISPLAY NAME | PRINTING FILE A |
| PRINTING SETTING DATA | ... |
| FILE NAME | FILE A |
| FILE FORMAT | word |
| PDL LIST | ... |
| URL FOR RELAYING NETWORK APPLICATION | http://xxxxxxxx |

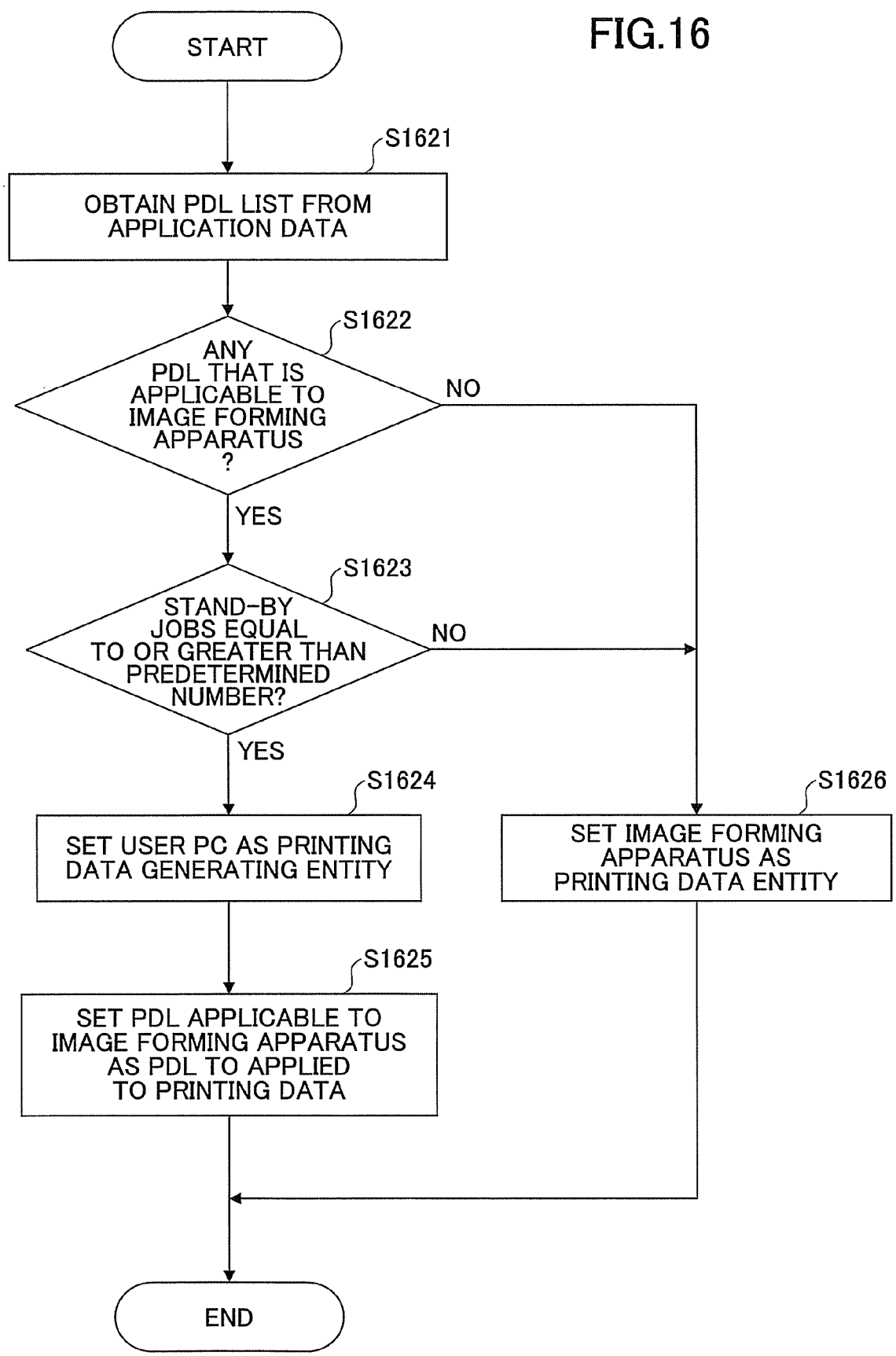

IMAGE FORMING APPARATUS, PRINTING CONTROL METHOD, AND COMPUTER-READABLE RECORDING MEDIUM THEREOF

BACKGROUND OF THE INVENTION

1. Field of the Invention

The present invention relates to an image forming apparatus, a printing control method, and a computer-readable recording medium thereof.

2. Description of the Related Art

Conventionally, PDL (Page Description Language) is set to be interpretable in correspondence with each printer. Therefore, in a case where a PC (Personal Computer) requests a printer to print a printing target (electronic document), the PC is to convert the electronic document into printing data described in a PDL that can be interpreted by the printer.

Recently, however, some printers are able to accept not only printing data but also an electronic document itself as a printing target. Such printers have functions of converting an electronic document received from a PC and printing the electronic document. Therefore, the conversion into printing data does not always need to be performed by the PC side.

Conventionally, however, the type of data format of the electronic document to be transmitted to the printer is decided by the PC side (the side requesting the printer to perform a printing process). Because such decision is made by the PC side, it is difficult to perform a printing process efficiently and flexibly.

SUMMARY OF THE INVENTION

The present invention may provide an image forming apparatus, a printing control method, and a computer-readable recording medium thereof that substantially eliminate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image forming apparatus, a printing control method, and a computer-readable recording medium thereof particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image forming apparatus connected to a network, the image forming apparatus including: a storage part; a printing request receiving part configured to receive a printing request from a data processing apparatus via the network and record the printing request in the storage part, the printing request including a page description language list indicating at least one page description language applicable to the data processing apparatus; a determining part configured to determine whether the data processing apparatus is to convert electronic data associated to the printing request into printing data based on whether the page description language list includes a page description language processable by the image forming apparatus; a data obtaining part configured to transmit a first request for transmitting the printing data to the data processing apparatus when the determining part determines that the data processing apparatus is to convert the electronic data into the printing data and transmit a second request for transmitting the electronic data to the data processing apparatus when the determining part determines that the data processing apparatus is not to convert the electronic data into the printing data and configured to receive the printing data or the electronic data in response to the first and second request; and a printing part configured to perform printing based on the printing data or the electronic data obtained from the data obtaining part.

Another embodiment of the present invention provides a printing control method executed with an image forming apparatus connected to a network, the printing control method including the steps of: a) receiving a printing request from a data processing apparatus via the network, the printing request including a page description language list indicating at least one page description language applicable to the data processing apparatus; b) recording the printing request in a storage part of the image forming apparatus; c) determining whether the data processing apparatus is to convert electronic data associated to the printing request into printing data based on whether the list of page description languages includes a page description language processable by the image forming apparatus; d) transmitting a first request for transmitting the printing data to the data processing apparatus when the data processing apparatus is determined to convert the electronic data into the printing data; e) transmitting a second request for transmitting the electronic data to the data processing apparatus when the data processing apparatus is determined not to convert the electronic data into the printing data; f) receiving the printing data or the electronic data in response to the first and second request; and g) printing data received in step f).

Another embodiment of the present invention provides a computer-readable recording medium on which a program for causing an image forming apparatus connected to a network to perform a printing control method, the printing control method including the steps of: a) receiving a printing request from a data processing apparatus via the network, the printing request including a page description language list indicating at least one page description language applicable to the data processing apparatus; b) recording the printing request in a storage part of the image forming apparatus; c) determining whether the data processing apparatus is to convert electronic data associated to the printing request into printing data based on whether the list of page description languages includes a page description language processable by the image forming apparatus; d) transmitting a first request for transmitting the printing data to the data processing apparatus when the data processing apparatus is determined to convert the electronic data into the printing data; e) transmitting a second request for transmitting the electronic data to the data processing apparatus when the data processing apparatus is determined not to convert the electronic data into the printing data; f) receiving the printing data or the electronic data in response to the first and second request; and g) printing data received in step f).

Other objects, features and advantages of the present invention will become more apparent from the following detailed description when read in conjunction with the accompanying drawings.

BRIEF DESCRIPTION OF THE DRAWINGS

FIG. 7 is a schematic diagram illustrating an example of application data of a printing application according to an embodiment of the present invention;

FIG. 9 is a schematic diagram illustrating a configuration of a user management table according to an embodiment of the present invention;

FIG. 12 is a schematic diagram illustrating a configuration of application data transmitted from a network application management server to an image forming apparatus according to an embodiment of the present invention;

FIG. 16 is a flowchart for describing procedures in an operation of determining an entity which is to generate printing data according to an embodiment of the present invention.

DETAILED DESCRIPTION OF THE PREFERRED EMBODIMENTS

In the following, embodiments of the present invention are described with reference to the accompanying drawings.

Figure 1:
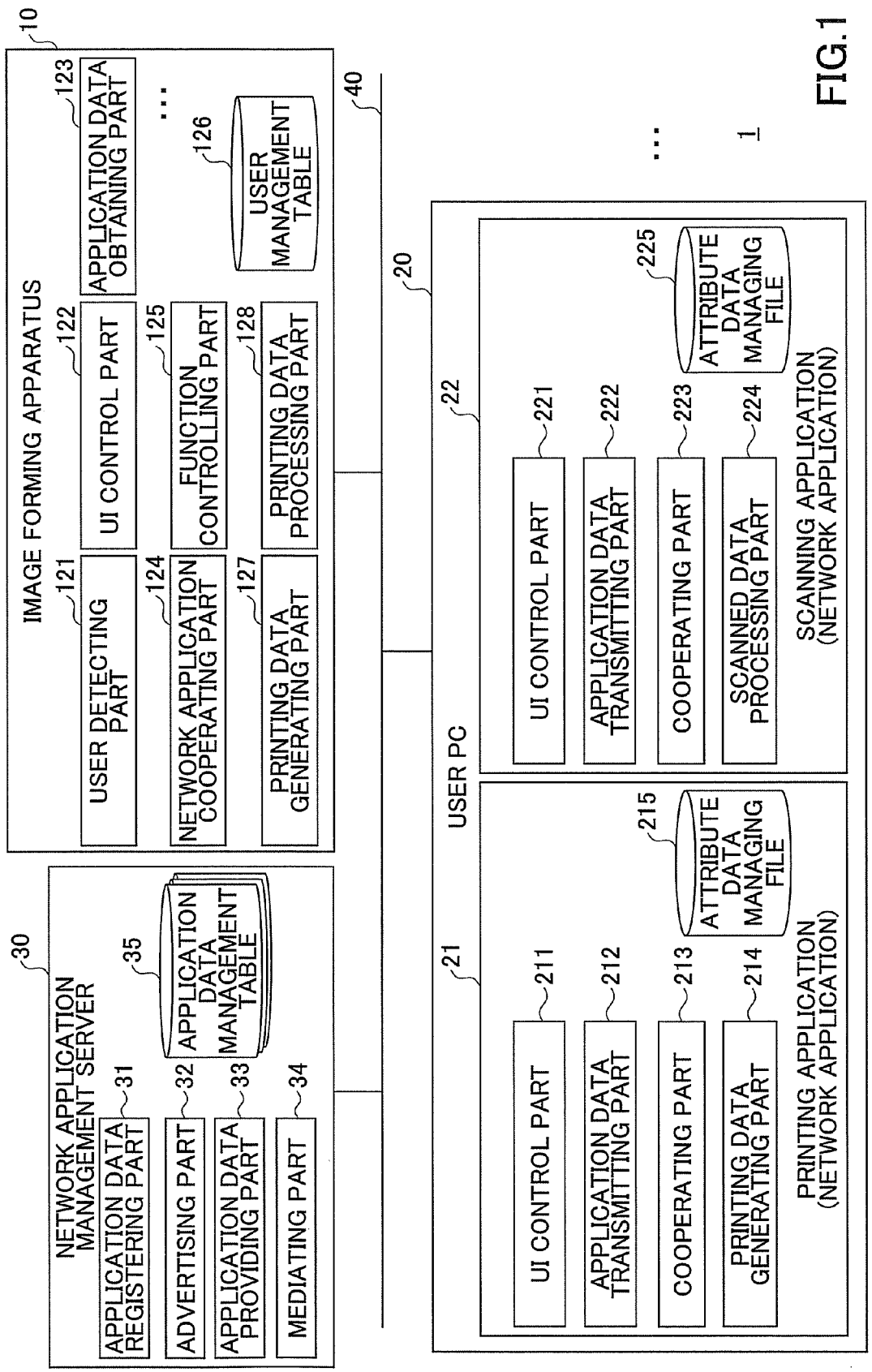
FIG. 1 is a schematic diagram illustrating a configuration of an image processing system according to an embodiment of the present invention.

FIG. 1 is a schematic diagram illustrating a configuration of an image processing system 1 according to an embodiment of the present invention. In the image processing system 1 of FIG. 1, a network (could be a wireless network or a wired network, or both) such as a LAN (Local Area Network) is connected to one or more image forming apparatuses 10, one or more user PCs 20, and a network application management server 30.

The user PC 20 is a PC (Personal Computer) assigned to each user. The user PC 20 includes an application(s) for providing a predetermined service(s) in cooperation with the image forming apparatus 10 (hereinafter also referred to as "network application"). In the embodiment of FIG. 1, the network application is illustrated as a printing application 21 and a scanning application 22. The printing application 21 is a network application for causing the image forming apparatus 10 capable of communicating through the network 40 to perform a printing job. The printing application 21 includes, for example, a UI (User Interface) controlling part 211, an application data transmitting part 212, a cooperating part 213, a printing data generating part 214, and an attribute data managing file 215.

The UI controlling part 211 is for displaying a screen regarding various printing applications 21 on a display apparatus 206 (described in detail below) of the user PC 20. The application data transmitting part 212 is for transmitting a request for registering application data of the printing application 21 (registration request) in correspondence with a printing instruction(s) input by the user via the UI controlling part 211. The application data includes data necessary for executing the printing application 21. It is to be noted that, in this embodiment, the application data of the printing application serve as a request for requesting the image forming apparatus 10 to perform printing (printing request). The cooperating part 213 is for controlling communications (e.g., exchanging of data) for cooperating with the image forming apparatus 10. The printing data generating part 214 generates printing data of a document file (electronic data) (PDL data (Page Description Language data)) which are to be printed by the image forming apparatus 10. The printing data generating part 214 generates the printing data by using a printer driver installed in the user PC 20. The attribute data managing file 215 is for storing attribute data of the printing application 21. The attribute data include, for example, an identifier (application ID) of the printing application 21, a user ID of the user having propriety of the printing application 21, and initial values of the printing setting data (data indicating printing conditions).

The scanning application 22 is a network application for executing predetermined processes (e.g., a transmission process (broadcasting process), data storing process) on image data scanned by the image forming apparatus 10. The scanning application 22 includes, for example, a UI (User Interface) controlling part 221, an application data transmitting part 222, a cooperating part 223, a scanned data processing part 224, and an attribute data managing file 225.

The UI controlling part 221 is for displaying a screen regarding various scanning applications 22 on the display apparatus 206 of the user PC 20. The application data transmitting part 222 is for transmitting a request for registering application data of the scanning application 22 (registration request) when the scanning application 22 is activated. The application data includes data necessary for executing the scanning application 22. The cooperating part 223 is for controlling communications (e.g., exchanging of data) for cooperating with the image forming apparatus 10. The attribute data managing file 225 is for storing data regarding settings of the scanning application 22 therein. The scanning data processing part 224 is for performing various processes (e.g., data transmission or data storage) on image data scanned by the image forming apparatus 10 and transferred to the user PC 20. The attribute data managing file 225 is also for storing attribute data of the scanning application 22. The attribute data of the scanning application 22 include, for example, an identifier of the scanning application 22 (application ID), a user ID of the user having propriety of the scanning application 22, and initial values of scanning setting data (data indicating scanning conditions). The user ID of the proprietor of each network application is recorded in the attribute data managing file 215 of the printing application 21 and the attribute data managing file 225 of the scanning application 22. Thus, each of the network applications belongs to a user. Accordingly, even if a network application is the same, the network application is differentiated with respect to each user to which the network application belongs. For example, in a case where a network application belongs to user A, access is basically permitted only for user A. Further, in a case where a network application belongs to user B, access is basically permitted only for user B. However, access to a network application may be permitted for a third person, for example, by using an access control function and granting the third person access to the network application.

Although only a single user PC 20 is illustrated in the embodiment of the FIG. 1, plural user PCs 20 may be connected to the network 40. However, each of the plural user PCs 20 may have different network applications.

The network application server 30 may be a computer including, for example, an application data registering part 31, an advertising part 32, an application data providing part 32, and a mediating part 34. The application data registering part 31 is for receiving a request for registering application data (registration request) along with the application data transmitted from the user PC 20 and storing the transmitted application data in an application data management table 35. The application data management table 35 is generated by a storage apparatus of the network application management server 30 in correspondence with each user. That is, each application data management table 35 manages application data of a network application belonging to each user. The advertising part 32 is for advertising (e.g., broadcasting, multicasting) the user ID included in the application data received by the application data registering part 31 throughout the network 40. The advertising is performed in user units (in user ID units). For example, even in a case where new application data are newly received after advertising of user A is performed, the advertising part 32 does not perform advertising in correspondence with the newly received data. This is because the advertising by the advertising part 32 is for reporting that there is a new user that can use (access) a network application. The advertising, however, may be performed in units of application data. In this case where advertising is performed in units of application data, an advertisement corresponding to the same user may be issued (user overlap). Nevertheless, such overlap of users can be eliminated at the side of the image forming apparatus 10. The application data providing part 33 is for providing (transmitting) the application data registered in the application data management table 35 to the image forming apparatus 10 in response to a request from the image forming apparatus 10. The mediating part 34 is for mediating communications between the network application and the image forming apparatus 10.

It is to be noted that one of the user PCs 20 may be used to serve as both a user PC 20 and a network application management server 30. That is, one of the user PCs 20 may also include the application data registering part 31, the advertising part 32, the application data providing part 33, and the mediating part 34.

In this embodiment, the image forming apparatus 10 is a multifunction machine that realizes plural functions (e.g., printing, scanning, copying, facsimile communications) within a single body (housing). Alternatively, the image forming apparatus 10 may be used to realize one of the plural functions. The image forming apparatus 10 includes a user detecting part 121, a UI controlling part 122, an application data obtaining part 123, a network application cooperating part 124, a function controlling part 125, a user management table 126, a printing data generating part 127, and a printing data processing part 128.

The user detecting part 121 is for detecting the user having access to the network application based on the advertisement issued by the network application management server 30 and registering data included in the advertisement (e.g., user ID) in the user management table 126. The user management table 126 is for managing a list of users existing in the network 40 which have access to the network application. The UI controlling part 122 is for receiving input (e.g., instructions for operating the network application) from the user. In other words, although the network application is allocated in the user PC 20, the network application can be controlled from a control panel 15 (described below) of the image forming apparatus 10. The application data obtaining part 123 is for obtaining application data from the network application management server 30. For example, the application data obtaining part 123 obtains application data of a network application belonging to a user selected from the users registered in the user management table 126. The network application cooperating part 124 is for controlling communications with respect to the network application. The function controlling part 125 is for controlling execution of functions requested from the network application. For example, processes such as printing and scanning are performed according to the controls of the function controlling part 125. The printing data generating part 127 is for converting data into document file printing data. The printing data processing part 128 is for generating printing images based on printing data.

Figure 2:
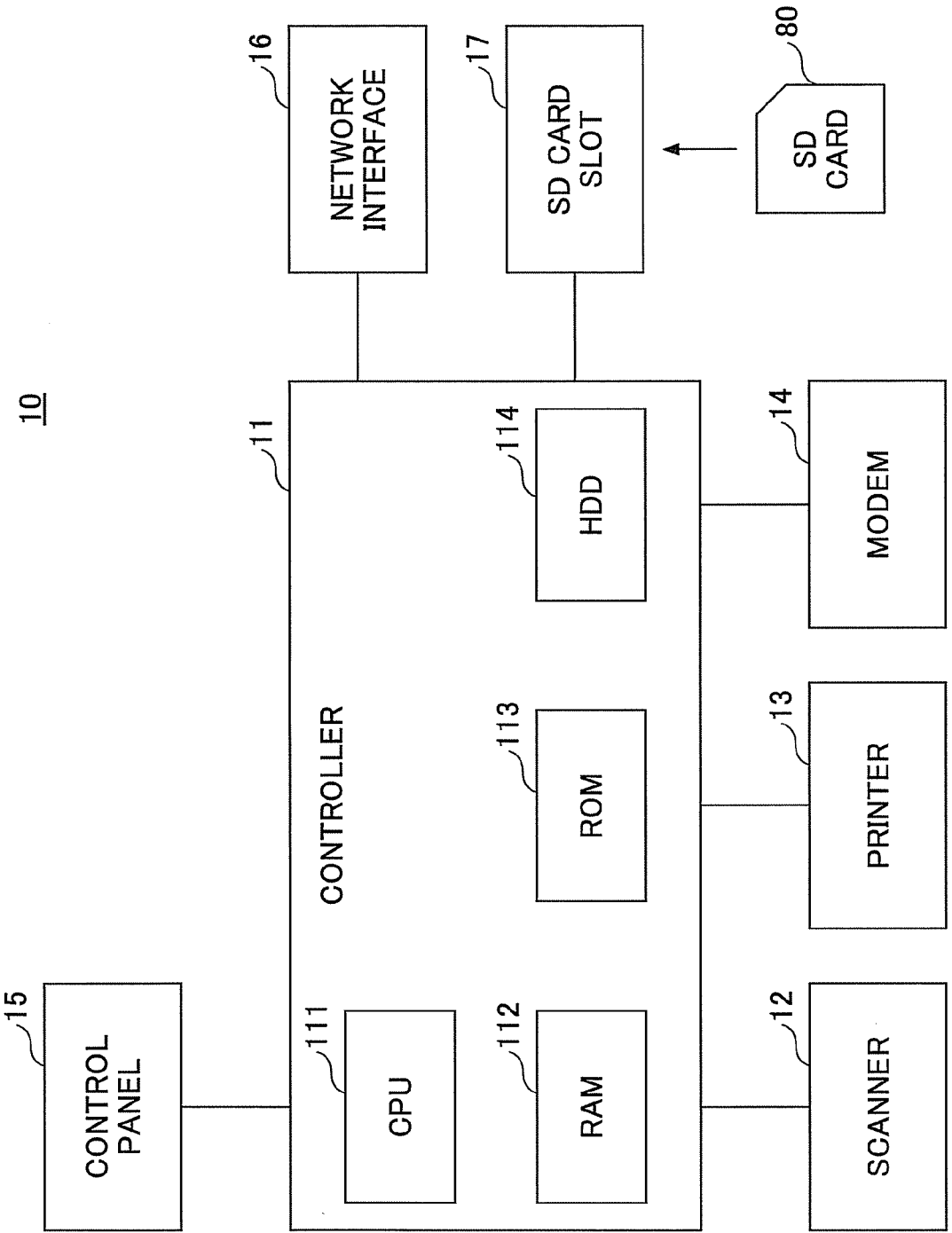
FIG. 2 is a block diagram illustrating a hardware configuration of an image forming apparatus according to an embodiment of the present invention.

Next, hardware configurations of each apparatus of this embodiment are described. FIG. 2 is a block diagram illustrating a hardware configuration of the image forming apparatus 10 according to an embodiment of the present invention. In FIG. 2, the image forming apparatus 10 includes hardware such as a controller 11, a scanner 12, a printer 13, a modem, a control panel 15, a network interface 16, and an SD card slot.

The controller 11 includes, for example, a CPU (Central Processing Unit) 111, a RAM (Random Access Memory) 112, a ROM (Read Only Memory) 113, and a HDD (Hard Disk Drive) 114. Various program and data used by the programs are recorded in the ROM 113. The RAM 112 is used, for example, as a storage space for loading a program(s) therein or a work space for processing the loaded program. The CPU 111 is for executing various functions by processing the loaded program. The HDD 114 stores programs and data used by the programs (e.g., user management table 126) therein.

The scanner 12 is hardware for reading image data from a document. The printer 13 is hardware for printing a printing image generated by the printing data processing part 128 to a sheet(s) of paper (printing paper). The modem 14 is hardware for connecting to a telephone line. The modem 14 is used for transmitting/receiving image data by facsimile communications. The control panel 15 is hardware including, for example, an input unit (e.g., button) for receiving input from the user and a display unit (e.g., liquid crystal panel). The network interface 16 is hardware for connecting with a network (e.g., LAN) regardless of whether the connection is wireless or wired. The SD card slot 17 is used for reading a program(s) recorded to a SD card (computer-readable recording medium) 80. That is, with the image forming apparatus 10, not only programs recorded in the ROM 113 but also programs recorded in the SD card 80 are loaded to the RAM 112 and executed by the CPU 111.

Figure 3:
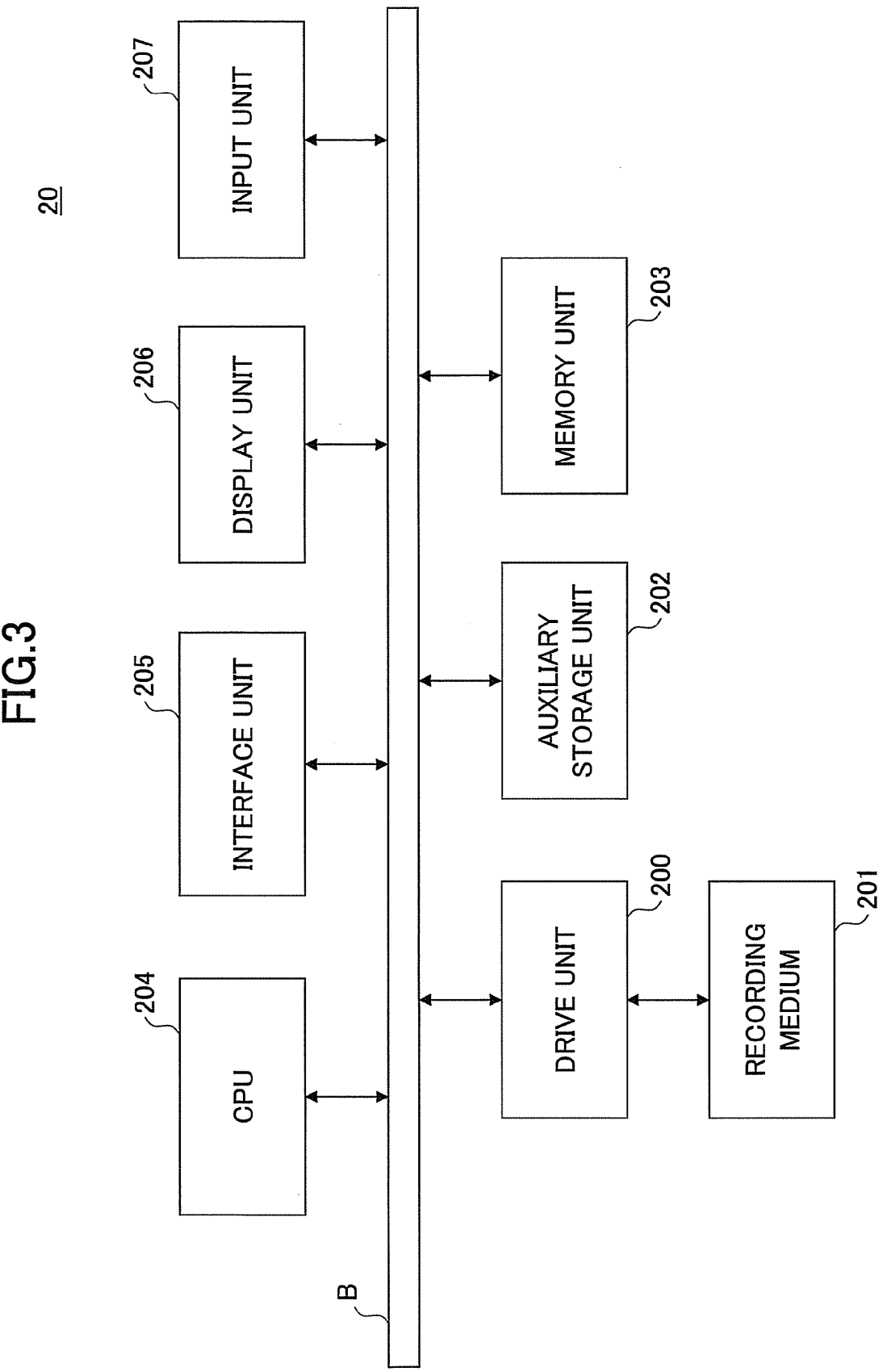
FIG. 3 is a schematic diagram illustrating a hardware configuration of a user PC according to an embodiment of the present invention.

FIG. 3 is a schematic diagram illustrating a hardware configuration of a user PC (data processing apparatus) according to an embodiment of the present invention. The user PC 20 of the FIG. 3 includes a drive unit 200, an auxiliary storage unit 202, a memory 203, a CPU 204, an interface unit 205, a display unit 206, and an input unit 207 that are connected to a bus B. The program used for performing the processes (operations) of the user PC 20 is provided by, for example, a recording medium (computer-readable recording medium) 201 (e.g., CD-ROM). When the recording medium 201 on which the program is recorded is mounted to a drive unit 200, the program is installed from the recording medium 201 to the auxiliary storage unit 202 via the drive unit 200. The installment of the program is not limited to installment from the recording medium 201. For example, the program may be downloaded from a computer via a network. The auxiliary storage unit 202 stores, for example, the installed program or necessary file data therein.

In a case where there is an instruction (command) to activate the program, the memory 203 reads out the program from the auxiliary storage unit 202 and stores the program therein. The CPU 204 executes the functions of the user PC 20 according to the program stored in the memory 203. The interface unit 205 is used as an interface for connecting with a network. The display unit 206 is for displaying, for example, a GUI (Graphical User Interface) according to the program. The input unit 207 includes, for example a keyboard and/or a mouse for inputting various operations and instructions (command).

Figure 4:
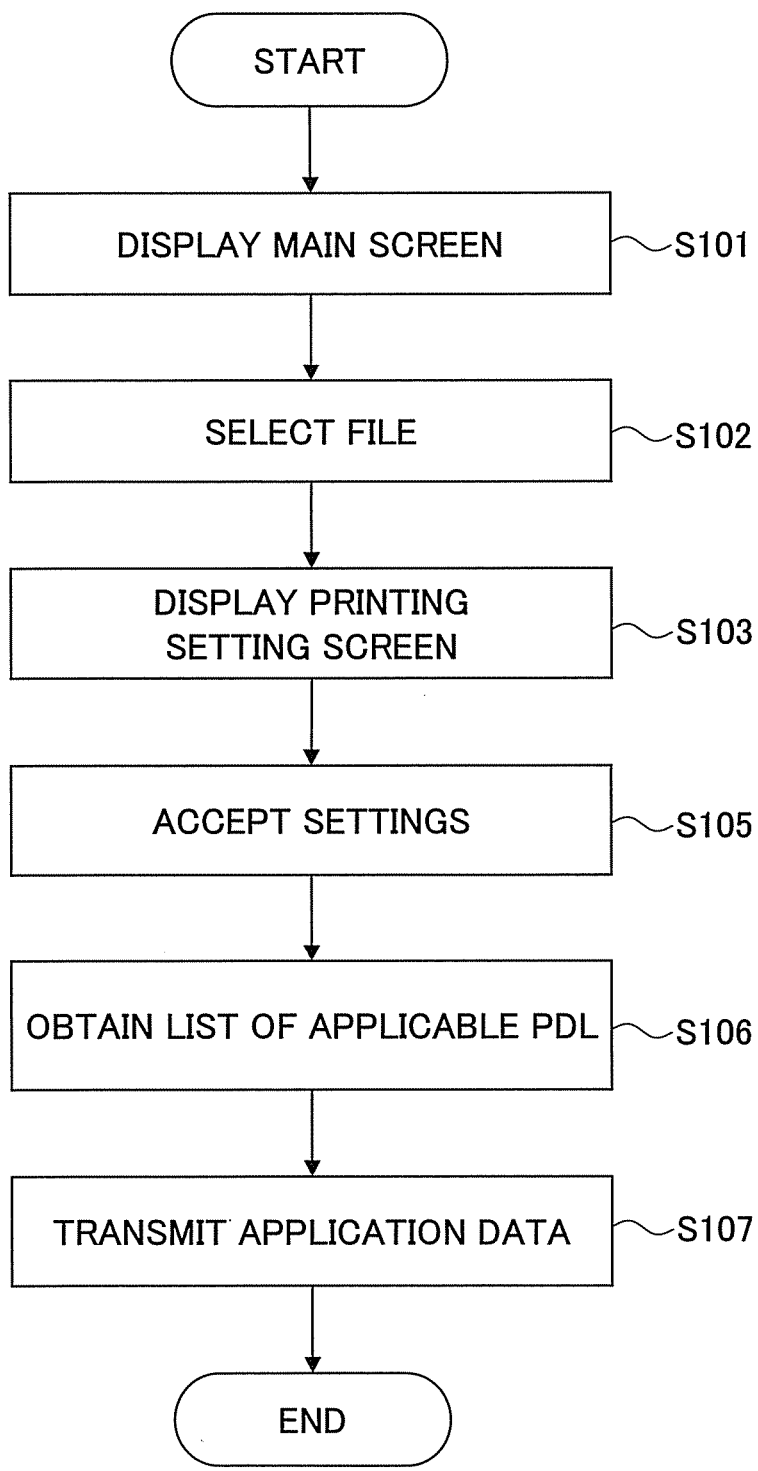
FIG. 4 is a flowchart for describing procedures of a printing application of a user PC according to an embodiment of the present invention.

Next, procedures (steps) of a data processing system 1 are described. FIG. 4 is a flowchart for describing the procedures of the printing application of the user PC 20 according to an embodiment of the present invention.

In accordance with an instruction to activate the printing application 21 (activation instruction) input from the user, the UI control part 211 orders a display unit 206 to display a main screen 510 (described below) of the printing application 21 (Step S101). Then, the UI control part 211 receives a selection of a document file (printing target) from the user (Step S102). The selection of the document file may be performed by, for example, dragging a document file icon and dropping the document file icon into a main screen 510 displayed on the display unit 206.

Figure 5:
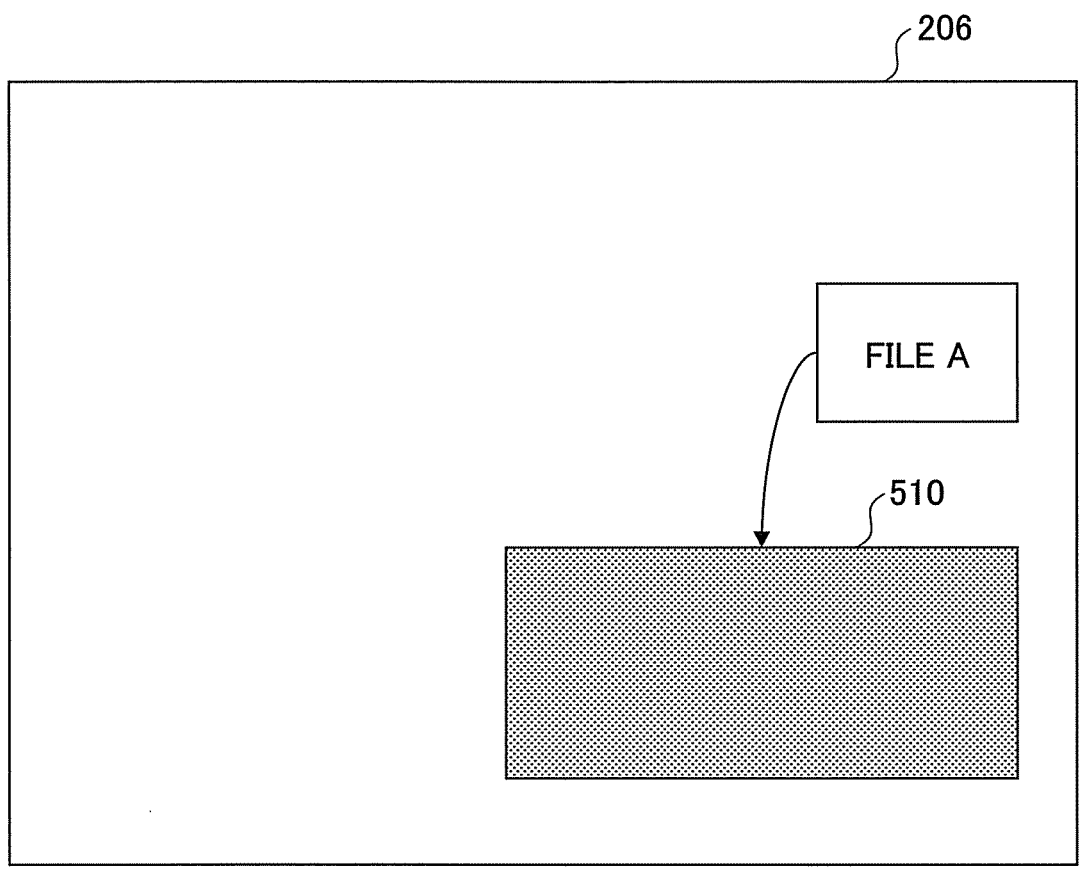
FIG. 5 is a schematic diagram illustrating an example where a document file is dragged and dropped into a main screen according to an embodiment of the present invention.

FIG. 5 is a schematic diagram illustrating an example where a document file is dragged and dropped into the main screen 21. In the example illustrated in FIG. 5, an icon of file A is dragged and dropped into the main screen 510 displayed on the display unit 206. It is to be noted that, although the main screen 510 is simply illustrated as a rectangle, the main screen 510 may include display items such as a tool bar or a pull-down menu. Further, the selection of the document file may be made via a file dialog (dialog allowing selection of files existing in a file system) displayed by selecting an item on a tool button or a menu.

Based on the selection of the document file, the UI control part 211 records the file name and the file type (file format) of the selected document file to the memory unit 203. The type of file is determined based on the extension of the document file.

Then, the UI control part 211 displays the icon of the selected document file in the main screen 510 along with displaying a printing setting screen 520 on the display unit 206 (Step S103).

Figure 6:
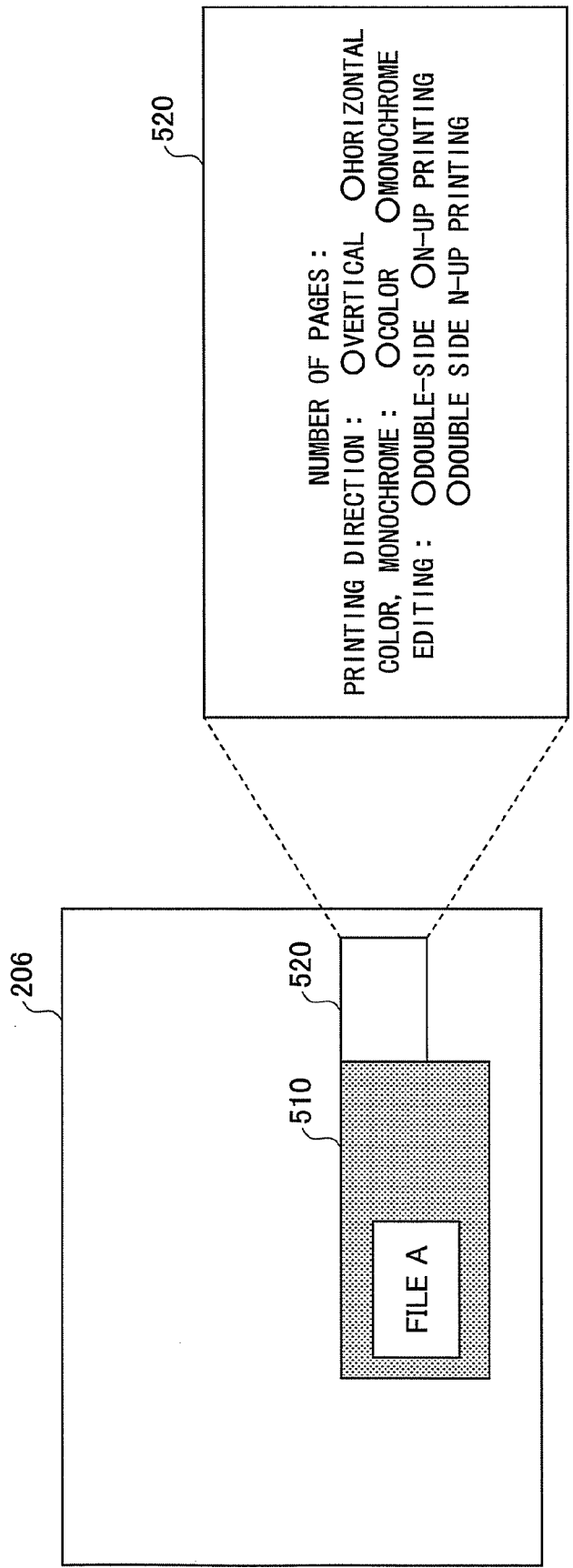
FIG. 6 is a schematic diagram illustrating an example of a printing setting screen being displayed on a display unit according to an embodiment of the present invention.

FIG. 6 is a schematic diagram illustrating an example of a printing setting screen 520 being displayed on the display unit 206. In FIG. 6, the printing setting screen 520 is displayed on the right side of the main screen 510 (an enlarged detailed view of the printing setting screen 520 is illustrated on the right side of FIG. 6). In the example illustrated in FIG. 6, the printing setting screen 520 allows setting of printing conditions such as i) number of pages, ii) printing direction, iii) color mode, iv) double side printing, and v) n-up printing (i.e. printing a document so that multiple pages are printed on one sheet of paper). The above-described items of the printing conditions are mere examples and are not limited to particular items.

When the values of the setting items of the are set to the printing setting screen 510, the UI control part 211 records the set data (hereinafter also referred to as "printing setting data") in the memory unit 203 (Step S105). Then, the application data transmitting part 211 obtains a list of types of page description languages (PDL) applicable for the printer driver installed in the user PC 20 (Step S106). The obtaining of the list of PDLs may be performed as follows. First, a list of printer drivers installed in the user PC 20 is obtained. Then, a PDL(s) corresponding to the printer drivers in the obtained list are obtained from each of the printer drivers.

Then, the application data transmitting part 211 generates application data of the printing application 21 based on the data obtained in Steps S105 and S106 and transmits the application data along with a request requesting registration of the application data to the network application management server 30 (Step S107). Data for communicating with the network application management server 30 (e.g., IP address, host address) are registered beforehand in each user PC 20.

FIG. 7 is a schematic diagram illustrating an example of application data of a printing application. In FIG. 7, the application data includes, for example, an application ID, a user ID, a cooperation function identifier, a network application address, a display name, a printing setting data, a file name, a file format, and a PDL list.

The application ID is identification data which uniquely identifies each network application. The user ID is identification data which identifies the user (owner of the printing application 21). The cooperation function identifier is data which identifies necessary functions of the image forming apparatus 10 cooperating with the network application (i.e. functions to be used by the network application). For example, the cooperation function identifier may be, "print" or "scan" in which "print" represents a printing function and "scan" represents a scanning function. The printing application 21 uses the printing function of the image forming apparatus 10. Therefore, the cooperation function identifier in the example of FIG. 7 is "print". The network application address is data for uniquely identifying each network application in network communications (e.g., URL (Uniform Resource Locator)). The display name is a character string for displaying the name of the network application. It is to be noted that the application ID, the user ID, the cooperation function identifier, the network application address, and the display name are obtained by, for example, the attribute data managing file 215.

The printing setting data are data that are set by using the printing setting screen 520. The printing setting data may include a value stored in the attribute data managing file 215. The file name and the file format are data obtained from the document file (printing target) and recorded in the memory unit 103. The PDL list is a list of page description languages obtained from the application data transmitting part 211 in which the page description languages are applicable (capable of being output) to the printer driver of the user PC 20.

Figure 8:
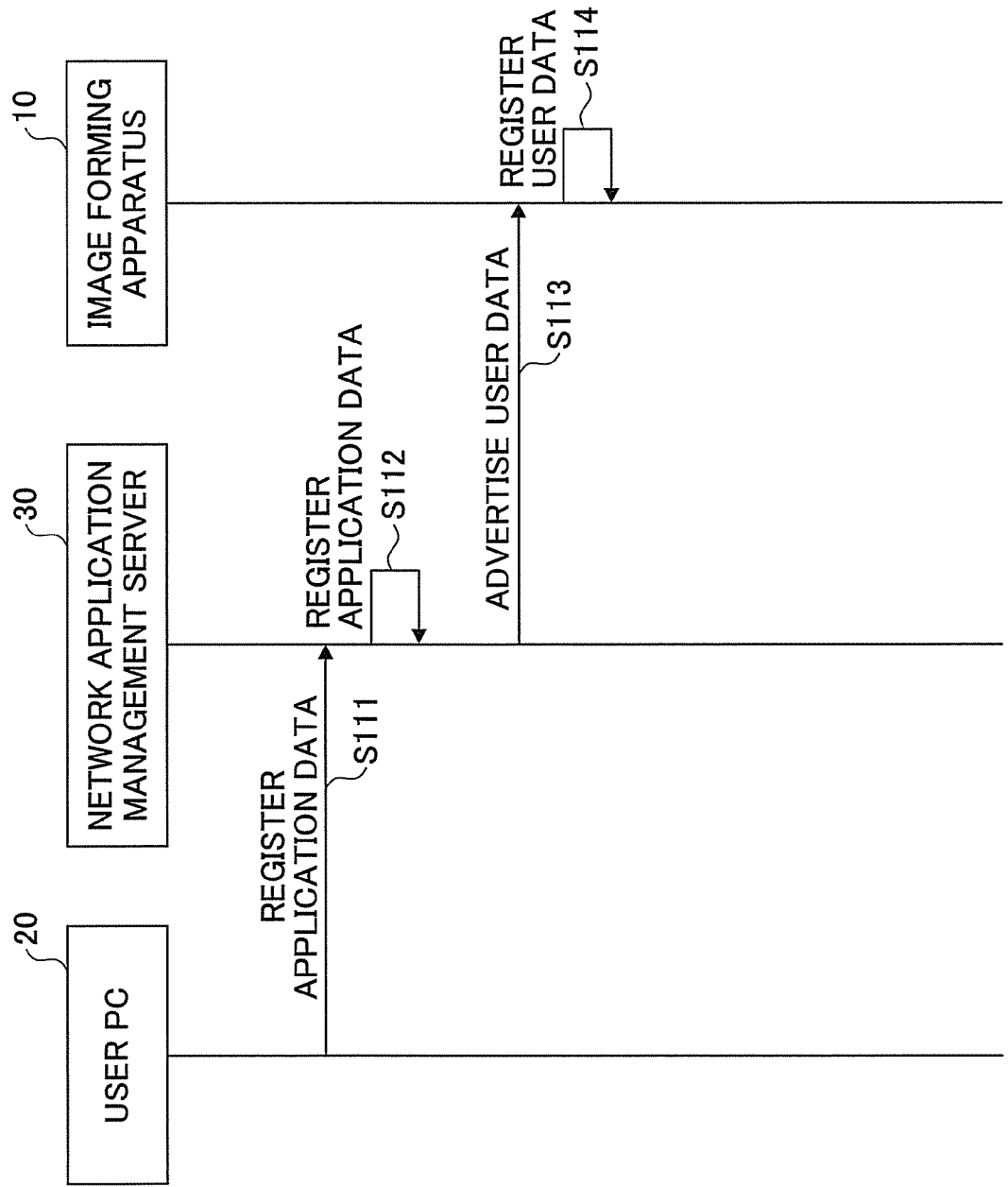
FIG. 8 is a sequence diagram for describing procedures performed when application data are transmitted according to an embodiment of the present invention.

Next, procedures of an exemplary operation performed when application data are transmitted in Step S7 is described. FIG. 8 is a sequence diagram for describing procedures performed when application data are transmitted according to an embodiment of the present invention.

In Step S111, the application data registering part 31 of the network application management server 30 receives application data transmitted from the application data transmitting part 212 and registers the received application data to the application data management table 35 corresponding to the user ID included in the received application data. In a case where no application data management table 35 corresponding to the user ID exists, the application data registering part 31 generates an application data management table 35 corresponding to the user ID and registers the received application data in the generated application data management table 35 (S112).

In a case where the application data management table 35 is generated (that is, a case where application data of a user corresponding to the user ID included in the received application data are registered for the first time), the advertising part 32 issues an advertisement on the network 40 (Step S113). In this embodiment, the advertisement contains the user ID included in the received application data and a URL for obtaining the application data (application data obtainment URL). The application data obtainment URL is a URL unique to each application data management table 35. For example, in a case where the application data registering part 31 generates an application data management table 35, the application data registering part 31 generates an application obtainment URL corresponding to the generated application data management table 35. In this embodiment, the application data management table 35 is generated with respect to each user. Therefore, the application data obtainment URL is unique to each user.

Then, when the user detecting part 121 of the image forming apparatus 10 receives the advertisement, the user detecting part 121 registers the user ID and the application data obtainment URL included in the advertisement to the user management table 126. (Step S114).

FIG. 9 is a schematic diagram illustrating a configuration of the user management table 126 according to an embodiment of the present invention. As illustrated in FIG. 6, the user management table 126 manages one or more combinations (pairs) of user IDs and application data obtainment URLs. FIG. 9 illustrates an example of records of user A and user B registered in the user management table 126. It is to be noted that the user management table 126 is stored in, for example, the HDD 114.

Then, the user, having instructed printing from the user PC 20 via the printing application 21, shifts to the image forming apparatus 10 at a predetermined timing and controls the printing application 21 from the image forming apparatus 10. It is to be noted that, in a case where plural image forming apparatuses 10 are connected to the network 40, the same advertisement is received by the user detecting part 121 of each of the image forming apparatuses 10 and the user ID and the application data obtainment URL contained in the advertisement are registered by the user management table 126 of each of the image forming apparatuses 10. Accordingly, the user is able to perform the below-described operation (procedure) of FIG. 10 from any one of the image forming apparatuses 10.

Figure 10:
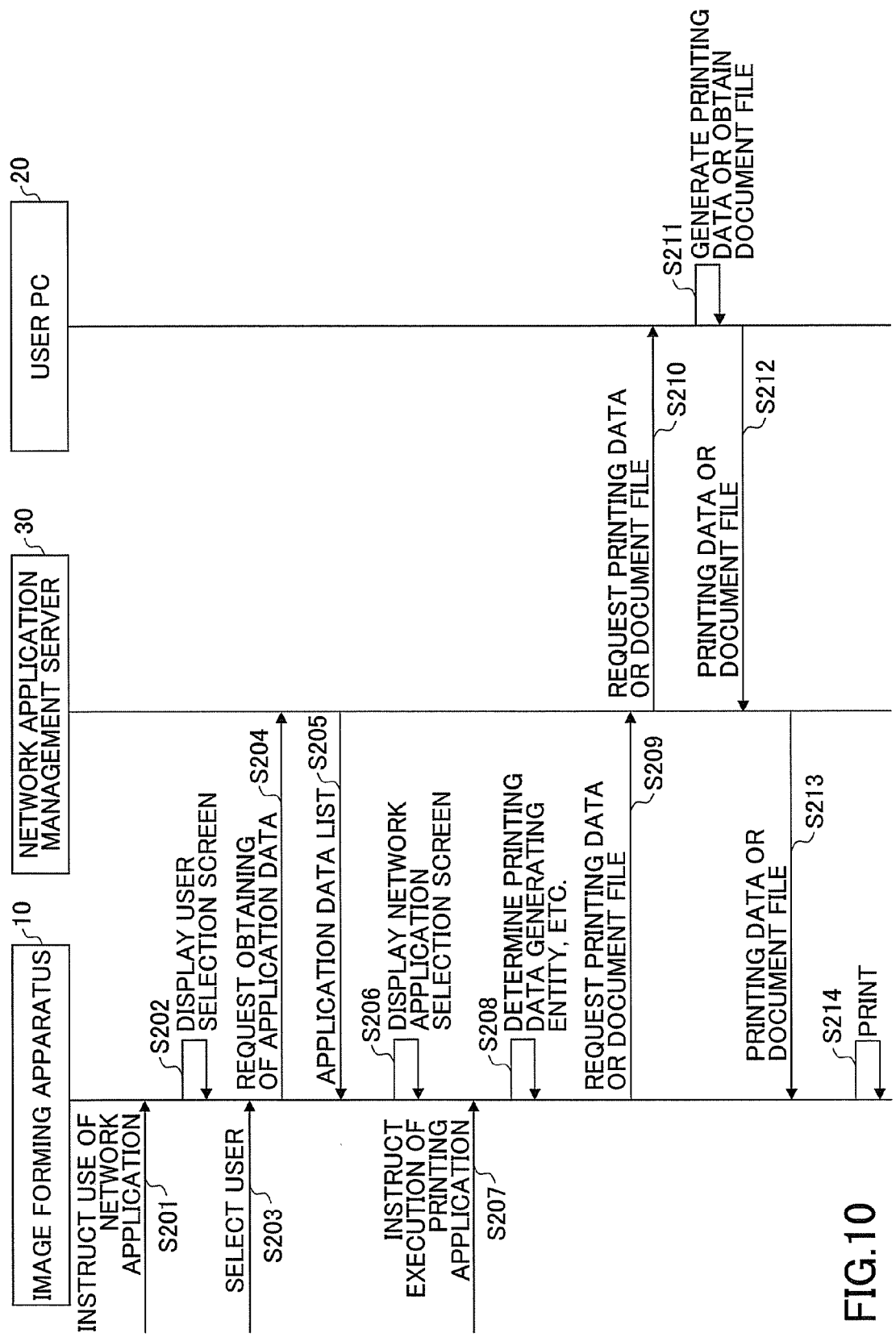
FIG. 10 is a sequence diagram for describing procedures performed in a case where a printing application is operated by an image forming apparatus according to an embodiment of the present invention.

FIG. 10 is a sequence diagram for describing procedures performed in a case where a printing application is operated by the image forming apparatus 10 according to an embodiment of the present invention.

When the user inputs an instruction to use a network application via the control panel 15 (Step S201), the UI control part 122 of the image forming apparatus 10 displays a user selection screen on the control panel 15 based on data registered in the user management table 126 (Step S202). In an alternative case, the UI control part 122 may obtain user data from the network application management server 30 and display the user selection screen based on the obtained user data in Step S202. In this alternative case, the performing of Step S113 of FIG. 8 may be omitted. The step S113 may, however, be performed by unicast with respect to an image forming apparatus 10 (an image forming apparatus 10 having an IP address registered in the network application management server 30 beforehand) having a subnet (subnetwork) different from that of the network application management server 30.

Figure 11:
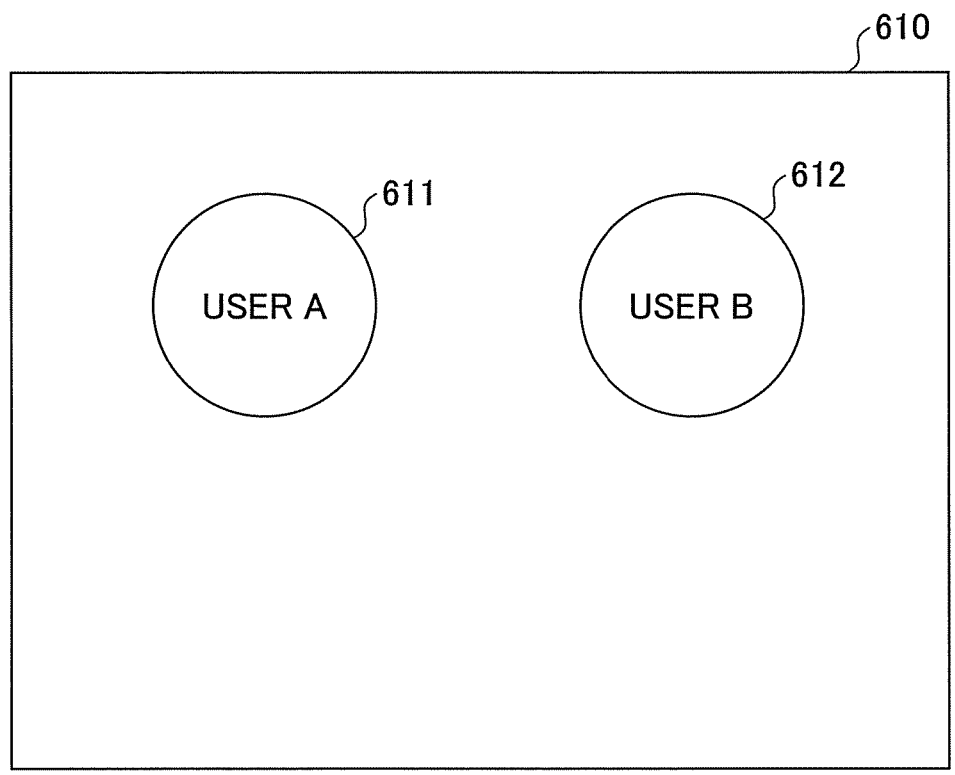
FIG. 11 is a schematic diagram illustrating an example of a user selection screen according to an embodiment of the present invention.

FIG. 11 is a schematic diagram illustrating an example of a user selection screen 610. In the user selection screen 610 of FIG. 11, buttons corresponding to each user ID are displayed. In FIG. 11, a button 611 corresponding to the user A and a button 612 corresponding to the user B are displayed on the user selection screen 610.

Then, in Step S203, the user selects a button corresponding to the user ID of the user himself/herself by pressing the corresponding button displayed on the user selection screen 610. In response to the pressing of the button, the application data obtaining part 123 obtains the application data obtainment URL associated to the user ID of the selected button from the user management table 126. It is to be noted that, user recognition (user authentication) may be performed when the button corresponding to the user ID is selected. In this case, subsequent procedures are performed only when the user has been authenticated.

Then, in Step S204, the application data obtaining part 123 transmits a request for obtaining application data (application data obtainment request) destined to a corresponding application data obtainment URL. The application data obtainment request transmitted from the application data obtaining part 123 is received by the application data providing part 33 of the network application management server 30. The application data providing part 33 obtains all of the network application data registered in the application data management table 35 corresponding to the application data obtainment URL (i.e. the application data management table 35 corresponding to the user operating the image forming apparatus 10) and transmits a list of the obtained application data (application data list) (Step S205). In the case of transmitting the application data list, the application data providing part 33 generates a URL for relaying communications between the image forming apparatus 10 and each network application (network application relay URL) in correspondence with each network application. The application data providing part 33 adds (attaches) the network application relay URL to application data corresponding to each network application and transmits a list of application data having attached the network application relay URL attached thereto to the image forming apparatus 10. Accordingly, the application data in the application data list transmitted in Step S205 may have a configuration such as the one illustrated in FIG. 12.

FIG. 12 is a schematic diagram illustrating a configuration of application data transmitted from the network application management server 30 to the image forming apparatus 10 according to an embodiment of the present invention.

The application data illustrated in FIG. 12 is application data having a URL for relaying a network application (network application relay URL) is added (attached) thereto. In Step S205, a list of the application data (application data list) of FIG. 12 is transmitted to the image forming apparatus 10. It is to be noted that the application data list is referred to as an application data list even if only a single item of application data (application data item) is included in the application data list. The network application relay URL may be added (attached) to the application data when the application data registering part 31 registers (records) application data to the application data management table 35.

Then, the UI control part 122 of the image forming apparatus 10 records the received application data list to the RAM 112 and displays a network application selection screen (Step S206).

Figure 13:
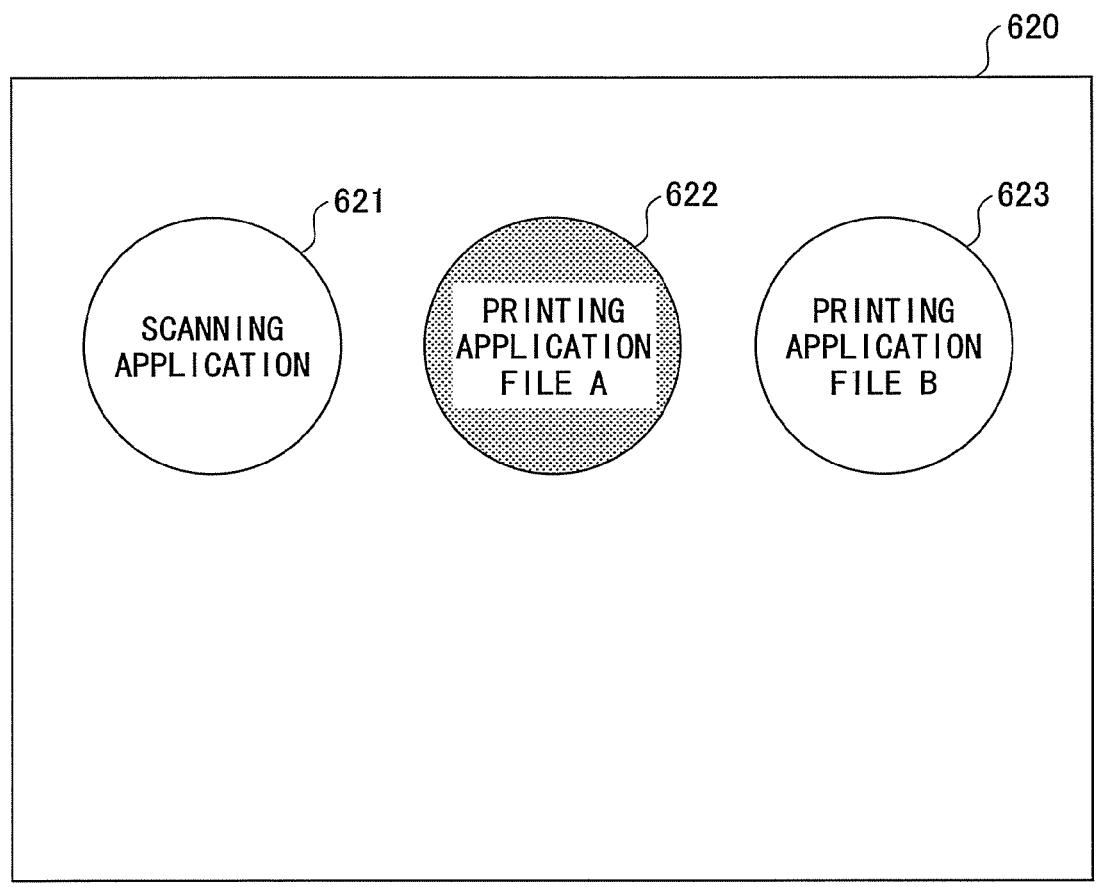
FIG. 13 is a schematic diagram illustrating an example of a network application selection screen according to an embodiment of the present invention.

FIG. 13 is a schematic diagram illustrating an example of a network application selection screen 620 according to an embodiment of the present invention. A button corresponding to each network application is displayed in the network application selection screen 620 of FIG. 13. In the example of FIG. 13, a button 621 corresponding to the scanning application 22, a button 622 corresponding to the printing application 21 associated to an instruction to print (printing instruction) file A, and a button 623 corresponding to an instruction to print (printing instruction) file B are displayed on the network application selection screen 620.

In this embodiment, buttons are displayed in units of printing requests (i.e., units of printing jobs) in a case where the network application is a printing application 21 whereas buttons are displayed in units of applications in a case where the network application is a scanning application 22. This difference is due to the difference of the timing in which a registration request is transmitted (issued) from the two network applications (scanning application, printing application). That is, the printing application 22 issues a registration request (registration request transmitted to the network application management server 30) in accordance with input of a printing request. Accordingly, in a case where a printing request for a file (e.g., document file) B is input after a printing request for a file (e.g., document file) A, the steps illustrated in FIGS. 4 and 8 are performed for each of the files. As a result, in a case where the network application is a printing application 21, application data are registered in the application data management table 35 in correspondence with each printing request (each printing job).

On the other hand, in a case where the network application is a scanning application 22, the scanning application 22 issues application data when the scanning application 22 is activated. That is, the procedures (steps) illustrated in FIG. 8 are performed when the scanning application 22 is activated. As a result, in a case where the network application is a scanning application 22, application data are registered in the application data management table 35 in units of applications.

Further, buttons are displayed in units of application data on the application selection screen 620. Accordingly, in a case where the network application is a printing application 21, buttons are displayed in units of printing requests (printing jobs). In a case where the network application is a scanning application 22, buttons are displayed in units of applications.

In the case where the network application is a printing application 21, buttons are displayed in units of printing jobs in view of operability (maneuverability).

For example, supposing that buttons are displayed in units of applications in a case where the network application is a printing application 21, an inputting operation (inputting maneuver) is to be performed at least four times. The inputting operations to be performed are: (1) instructing use of a network application, then (2) selecting a user on the user selection screen 610, then (3) selecting a printing application 21 on the application selection screen 620, and then (4) selecting a file (printing target) to be printed. The number in the parenthesis (1)-(4) indicates the number of times the inputting operation (inputting operation) is performed. In addition, the control panel 15 of the image forming apparatus 10 generally tends to have lower operability compared to a user interface (e.g., mouse, keyboard) of a PC (Personal Computer). Thus, selecting a document file as a printing target by using the control panel 15 increases the operation load. Further, enabling selection of document files stored in the user PC from the image forming apparatus 20 leads to an increase of the cost for installing a necessary program(s) to the image forming apparatus 20.

On the other hand, by displaying buttons in units of printing jobs in a case where the network application is a printing application 21, an inputting operation (inputting maneuver) is performed three times. The inputting operations (inputting maneuvers) that are performed are: (1) instructing use of a network application, then (2) selecting a user on the user selection screen 610, and then (3) selecting a printing application 21 on the application selection screen 620.

Accordingly, in this embodiment of the present invention, in a case where the network application is a printing application 21, buttons are displayed in units of printing jobs. In FIG. 13, the button 622 is grayed out (described in detail below).

Then, in Step S207, a button corresponding to the printing application 21 for performing one of the printing jobs is selected by pressing the button and a start key of the control panel 15 is pressed for instructing execution of the printing application 21. Accordingly, the network application cooperating part 124 recognizes that a printing operation is to be executed based on a cooperation function identifier ("print") included in the application data corresponding to the pressed button (hereinafter also referred to as "current application data"). In order to execute the printing operation, printing data are to be obtained. Therefore, the network application cooperating part 124 determines whether printing data (data in the form of page description language) of the document file to be printed should be generated by the image forming apparatus 10 or the user PC 20 at which the printing application 21 is allocated (Step S208). In a case where the network application cooperating part 124 determines that the printing data are to be generated by the user PC 20, the network application cooperating part 124 determines the type of page description language to be used for generating the printing data. In this embodiment, printing data are not always generated by either one of the user PC 20 or the image forming apparatus 10; instead, the entity that generates printing data dynamically changes according to the status of the image forming apparatus 10.

Then, the network application cooperating part 124 transmits a request for transmission of document data or a document file (transmission request) to the network application relay URL included in the current application data according to the result of the determination by the network application cooperating part 124 (Step S209). In a case where the network application cooperating part 124 determines that the printing data are to be generated by the user PC 20, the object requested to be transmitted is printing data. In a case where the network application cooperating part 124 determines that the printing data are to be generated by the image forming apparatus 10, the object requested to be transmitted is a document file. In the transmission request, a file name included in the current application data is designated. Further, in a case where the object requested to be transmitted is printing data, the type of page description language is also designated in the transmission request.

The transmission request addressed to the network application relay URL is received by the mediating part 34 of the network application management server 30. The mediating part 34 obtains the application data corresponding to the network application relay URL from the application management table 35 and transfers the transmission request to the network application address included in the obtained application data (Step S210).

Then, the transmission request addressed to the network application address is received by the cooperating part 213 of the printing application 21 of the user PC 20. In a case where the object requested to be transmitted is printing data, the cooperating part 213 requests the printing data generating part 214 to generate printing data. The printing data generating part 214 obtains a document file having a file name designated in the transmission request from the auxiliary storage unit 102 and generates printing data of the document file (Step S211). In the step of generating the printing data, the printing data generating part 214 generates printing data of the document file by using a printer driver that can generate (output) the printing data in a page description language designated in the transmission request.

On the other hand, in a case where the object requested to be transmitted is a document file, the cooperating part 213 obtains a document file having a file name designated in the transmission request from the auxiliary storage unit 102 (Step S211).

Then, the cooperating part 213 returns the generated printing data or the obtained document file to the mediating part 34 of the network application management server 30 (Step S212). Then, the mediating part 34 transfers the printing data or the document file to the network application cooperating part 124 of the image forming apparatus 10 (Step S213).

The network application cooperating part 124 inputs the transferred printing data or the document file to the function controlling part 125. In a case where printing data are input, the function controlling part 125 instructs (controls) the printing data processing part 128 to generate a printing image based on the printing data and instructs (controls) the printer 13 to transfer the generated printing image onto a printing paper (Step S214).

On the other hand, in a case where a document file is input, the function controlling part 125 instructs (controls) the printing data generating part 127 to convert the document file to printing data and instructs (controls) the printing data processing part 128 to generate a printing image based on the printing data converted from the document file (Step S213). Further, the function controlling part 125 instructs (controls) the printer 13 to transfer the generated printing image onto a printing paper (Step S214).

The procedures (steps) of FIG. 10 may be performed in parallel with the procedures (steps) of FIG. 8. For example, in a case where one user is currently operating the image forming apparatus 10, a request to register application data (registration request) from a network application of the user PC 20 of another user may be transmitted, so that data (e.g., user ID) contained in the application data can be registered in the user management table 126 of the image forming apparatus 10.

Next, an embodiment where the button 622 of FIG. 13 is grayed out is described. The grayed out button 622 indicates that the function (ability) of the image forming apparatus 10 cannot be completely applied to the printing setting data that are set to the printing job corresponding to the button 622. That is, the image forming apparatus 10 for performing a printing operation (printing destination) cannot be designated from the printing setting screen 520 of the printing application 21. Therefore, the setting items that can be set from the printing setting screen 520 are not always applicable to the image forming apparatus 10 to be operated by the user. Thus, the image forming apparatus 10 might not completely fulfill the printing setting data set from the printing setting screen 520.

The button 622 is grayed out by performing the below-described procedures of FIG. 14 on each button corresponding to the printing application 122 when the UI control part 122 of the image forming apparatus 10 displays the network application selection screen 620 (Step S206 of FIG. 10).

Figure 14:
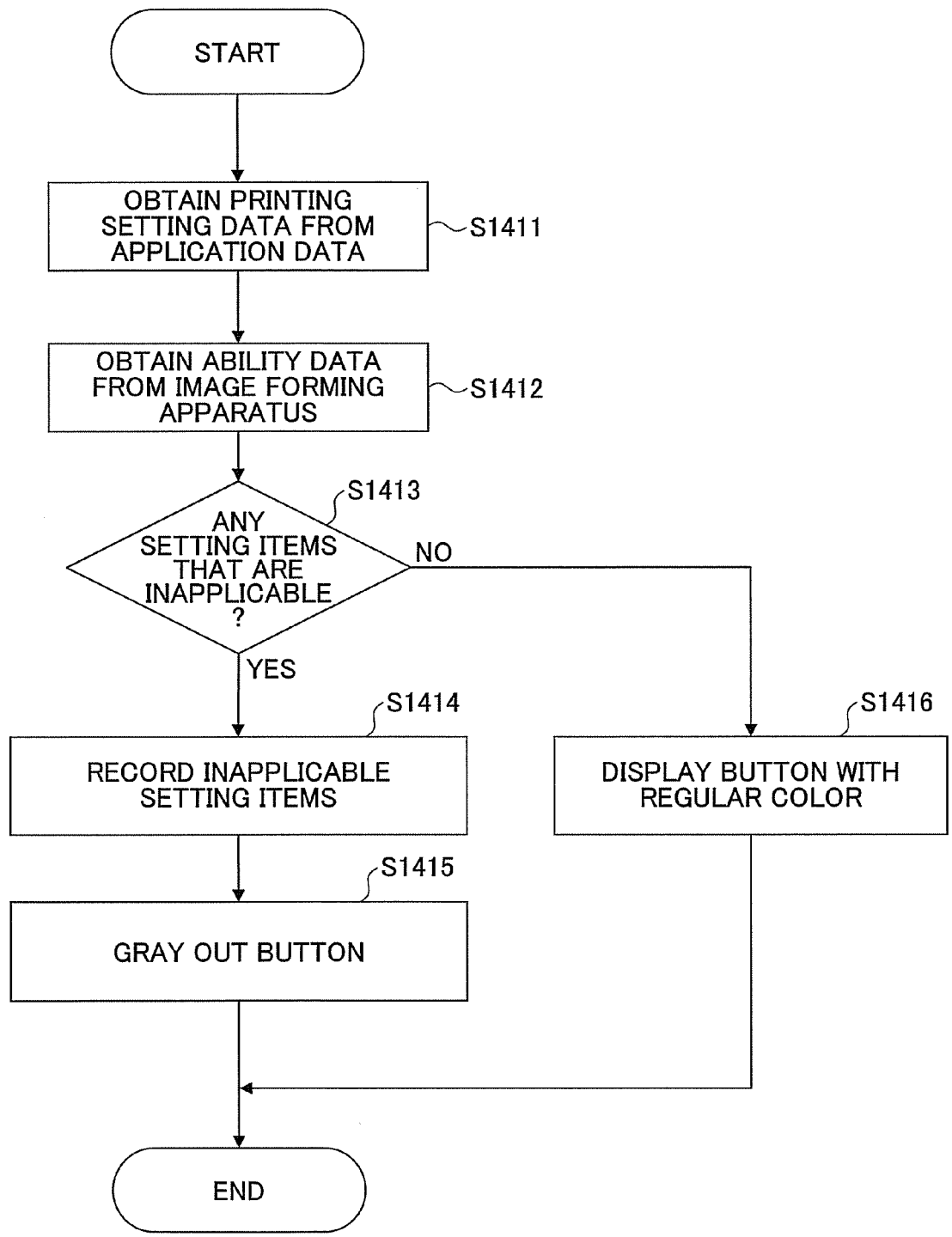
FIG. 14 is a flowchart for describing procedures performed when displaying buttons of a printing application according to an embodiment of the present invention.

FIG. 14 is a flowchart for describing procedures performed when displaying the buttons of the printing application 21 according to an embodiment of the present invention.

In Step S1411, the UI control part 122 extracts printing setting data from the application data corresponding to the button to be processed (target process button). Then, the UI control part 122 obtains ability data from the image forming apparatus 10 (Step S1412). The ability data includes a list of printing settings (printing setting items) that are applicable to the image forming apparatus 10. The ability data are stored in, for example, the HDD 114 of the image forming apparatus 10. Then, the UI control part 122 determines whether there are any printing setting items that cannot be applied to the image forming apparatus 10 by determining whether all of the printing setting items designated in the printing setting data are included in the ability data (Step S1413).

In a case where there is an inapplicable setting item (i.e. a case where a printing setting item designated in the printing setting data is not included in the ability data) (Yes in Step S1413), the UI control part 122 associates the inapplicable printing setting to the target process button and records the inapplicable printing setting in association with the target process button (Step 1414). Then, the UI control part 122 grays out the target process button (Step S1415).

In a case where there is no inapplicable setting item (i.e. a case where all printing setting item designated in the printing setting data are included in the ability data) (No in Step S1413), the UI control part 122 displays the target process button with a regular color (Step S1416).

In a case where the grayed out button 622 is selected, the UI control part 122 reports the inapplicable printing setting item stored in the RAM 112 to the user.

Figure 15:
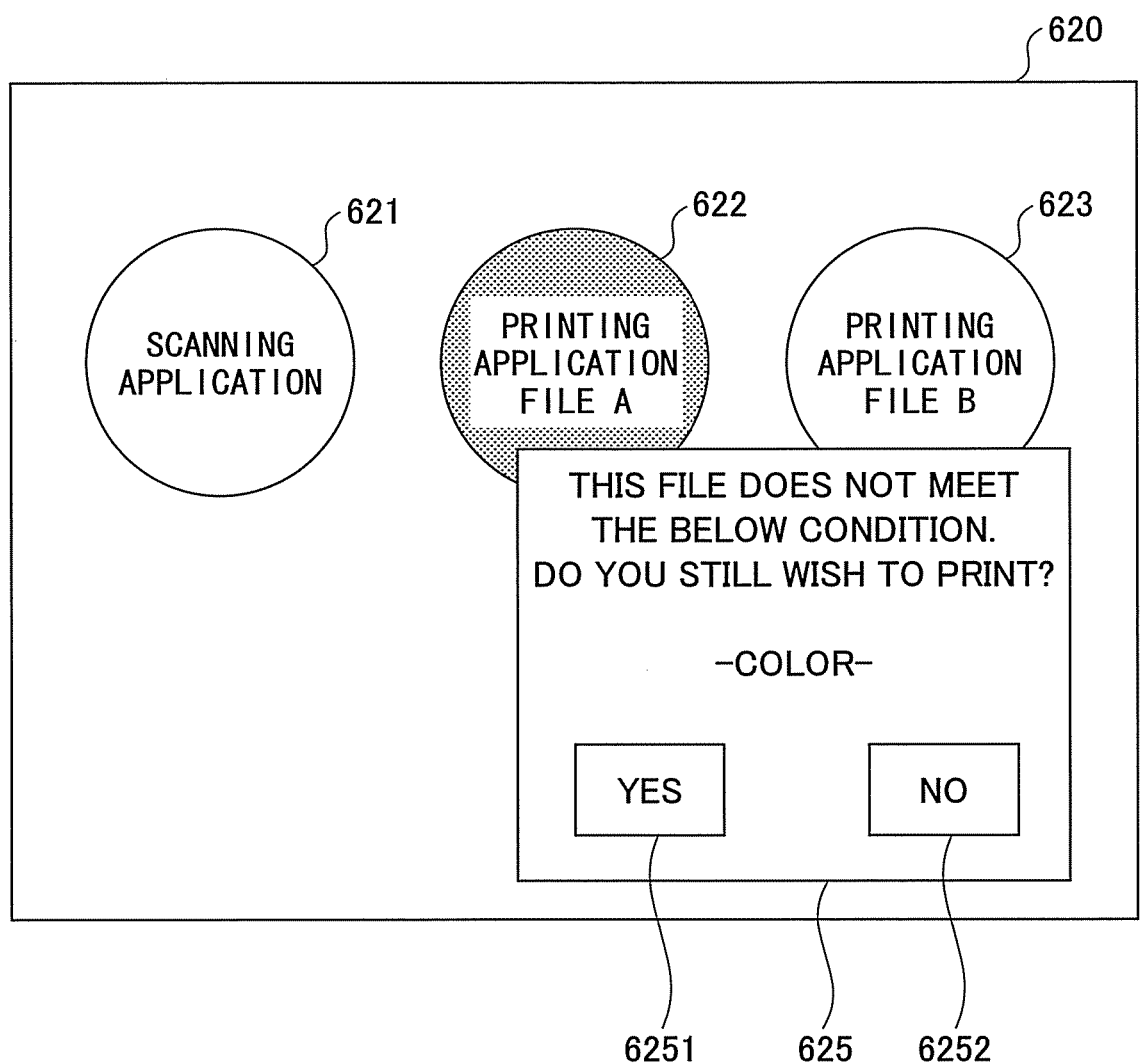
FIG. 15 is a schematic diagram illustrating an example of a report for notifying an inapplicable printing setting item according to an embodiment of the present invention.

FIG. 15 is a schematic diagram illustrating an example of a report for notifying the inapplicable printing setting item. A reporting screen 625 is displayed in an overlapping manner on the network application selection screen 620. A report indicating that color printing cannot be performed and a message asking whether to execute a printing operation are displayed in the reporting screen 625.

If the user wishes to execute a printing operation even if color printing cannot be performed, the user presses a Yes button 6251 on the reporting screen 625. If the user does not wish to execute a printing operation, the user presses a No button 6252 on the reporting screen 625.

When the Yes button 6251 is pressed, the button 622 turns into a selected state. When the No button 6252 is pressed, the button 622 does not turn into a selected state. When the start key of the control panel 15 is pressed in the case where the button 622 is in a selected state, the printing job corresponding to the button 622 is executed according to Step S207 and the steps thereafter illustrated in FIG. 10. In this case, however, the printing setting items inapplicable to the image forming apparatus 10 are ignored when performing the printing operation.

Next, a determining operation of Step S208 is described according to an embodiment of the present invention. FIG. 16 is a flowchart for describing procedures in an operation of determining an entity which is to generate printing data (printing data generating entity).

In Step S1621, the network application cooperating part 124 obtains a list of PDL from the current application data. Then, the network application cooperating part 124 determines whether the obtained PDL list includes a PDL (Page Description Language) applicable to (processable for) the printing data processing part 128 of the image forming apparatus 10 (Step S1622). A page description language applicable to the printing data processing part 128 can be obtained by querying the printing data processing part 128. Further, whether the page description language is applicable to the printing data processing part 128 can be determined based on data stored in the HDD 114. In FIG. 1, although the printing data processing part 128 is illustrated as a single rectangle, plural printing data processing parts 128 may be provided in correspondence with reach page description language.

In a case where a page description language applicable to the printing data processing part 128 is included in the PDL list (i.e. a case where a page description language that can be processed by the printing data processing part 128 is included in the page description languages that can be generated in the user PC 20), the network application cooperating part 124 determines whether the number of jobs in standby (standby jobs) in the image forming apparatus 10 is equal to or greater than a predetermined number (a threshold set beforehand) (Step S1623). The number of standby jobs may be the total number of application data items recorded in the RAM 112 by the application data obtaining part 123 (that is, the number of buttons on the network application selection screen 620). Further, the number of standby jobs may be the number of application data items related to the printing application 21 included the application data recorded in the RAM 112. Whether application data are related to the printing application may be determined based on whether the value of the cooperation function identifier is "print".

In a case where the number of standby jobs is equal to or greater than the predetermined number (Yes in Step 1623), the network application cooperating part 124 determines that the printing data generating entity is the user PC 20 (Step S1624). Accordingly, by reducing the workload of the image forming apparatus 10, standby jobs can be handled (executed). Then, the network application cooperating part 124 selects the page description language applicable to the printing data processing part 128 from the page description languages in the PDL list and sets the selected page description language as the page description language to be generated by the user PC 20 (page description language to be used for the printing data) (Step S1625). In a case where there are plural corresponding page description languages, a given page description language can be selected. For example, the printing data processing part 128 may prioritize the applicable page description languages beforehand and select the page description language having highest priority. In a case where all of the page description languages included in the PDL list are applicable to the printing data processing part 128, the page description language may be selected by the user PC 20 instead of selecting by the image forming apparatus 10. In this case, the page description language need not be designated in Step S209 of FIG. 10.

Either in a case where there is no page description language applicable to the printing data processing part 128 in the PDL list (No in Step 1622) or a case where the number of standby jobs is less than the predetermined number (No in Step 1623), the network application cooperating part 124 determines that the printing data generating entity is the image forming apparatus 10 (Step S1626).

It is to be noted that, besides the number of standby jobs, the determining of the entity that should generate the printing data may be performed by referring to the indices enabling the CPU 111 to determine the workload of the image forming apparatus (e.g., usage rate of CPU 111, memory capacity).

With the above-described embodiment, the role for generating printing data can be dynamically set to the image forming apparatus 10 or the user PC 20. As a result, the printing process can be performed efficiently and flexibly.

The above-described embodiment of the present invention is a case where the network application management apparatus 30 mediates the user PC 20 and the image forming apparatus 10. In the above-described embodiment, by concentrating (gathering) the apparatuses/units communicating with the image forming apparatus 10 to the network application management apparatus 30, the communication protocol used for communicating with the image forming apparatus 10 can be limited to the network application management apparatus 30. Further, the amount of data for communicating with the image forming apparatus 10 can be reduced. In an alternative case, the communications may be performed directly between each user PC 20 and the image forming apparatus 10. In this alternative case, each user PC 20 includes the function (s) of the network application management apparatus 30.

The present invention is not limited to the specifically disclosed embodiments, and variations and modifications may be made without departing from the scope of the present invention.

The present application is based on Japanese Priority Application No. 2008-333731 filed Dec. 26, 2008, the entire contents of which are hereby incorporated herein by reference.

What is claimed is:

1. An image forming apparatus connected to a network, the image forming apparatus comprising:
   a storage part;
   a printing request receiving part configured to receive a printing request from a data processing apparatus via the network and record the printing request in the storage part, the printing request including a page description language list indicating at least one page description language applicable to the data processing apparatus;
   a determining part configured to determine whether the data processing apparatus is to convert electronic data associated to the printing request into printing data based on whether the page description language list includes a page description language processable by the image forming apparatus;
   a data obtaining part configured to transmit a first request for transmitting the printing data to the data processing apparatus when the determining part determines that the data processing apparatus is to convert the electronic data into the printing data and transmit a second request for transmitting the electronic data to the data processing apparatus when the determining part determines that the data processing apparatus is not to convert the electronic data into the printing data and configured to receive the printing data or the electronic data in response to the first and second request; and
   a printing part configured to perform printing based on the printing data or the electronic data obtained from the data obtaining part.

2. The image forming apparatus as claimed in claim 1, wherein the data obtaining part is configured to designate the page description language processable by the image forming apparatus when transmitting the first request to the data processing apparatus.

3. The image forming apparatus as claimed in claim 1, wherein the determining part is configured to determine whether the data processing apparatus is to convert electronic data associated to the printing request into printing data based on the number of the printing requests recorded in the storage part.

4. The image forming apparatus as claimed in claim 1, further comprising:
   a display part; and
   a display control part configured to instruct the display part to display a list of the printing request recorded in the storage part;
   wherein the printing request contains printing setting data,
   wherein the display part is configured to display a printing request list indicative of the printing requests, and
   wherein the printing request list enables identification of an inapplicable printing request containing printing setting data that are not applicable to the image forming apparatus.

5. The image forming apparatus as claimed in claim 4, wherein the display part is configured to display the printing setting data that are not applicable to the image forming apparatus when the inapplicable printing request is selected from the printing request list.

6. The image forming apparatus as claimed in claim 1, wherein the data processing apparatus includes
   a printing requesting part configured to transmit the printing request to the image forming apparatus;
   a data request receiving part configured to receive the first request or the second request from the image forming apparatus based on the printing request;
   a printing data generating part configured convert the electronic data into the printing data when the data request receiving part receives the first request; and
   a data transmitting part configured to transmit the electronic data when the data request receiving part receives the second request and transmit the printing data when the data request receiving part receives the first request.

7. The image forming apparatus as claimed in claim 6, wherein the printing data generating part is configured to convert the electronic data into the printing data described in a page description language designated in the first request.

8. The image forming apparatus as claimed in claim 6, wherein the printing requesting part is configured to transmit the printing request including the page description language list indicating at least one page description language applicable to the data processing apparatus.

9. A printing control method executed with an image forming apparatus connected to a network, the printing control method comprising the steps of:
   a) receiving a printing request from a data processing apparatus via the network, the printing request including a page description language list indicating at least one page description language applicable to the data processing apparatus;
   b) recording the printing request in a storage part of the image forming apparatus;
   c) determining whether the data processing apparatus is to convert electronic data associated to the printing request into printing data based on whether the list of page description languages includes a page description language processable by the image forming apparatus;
   d) transmitting a first request for transmitting the printing data to the data processing apparatus when the data processing apparatus is determined to convert the electronic data into the printing data;
   e) transmitting a second request for transmitting the electronic data to the data processing apparatus when the data processing apparatus is determined not to convert the electronic data into the printing data;
   f) receiving the printing data or the electronic data in response to the first and second request; and
   g) printing data received in step f).

10. The printing control method as claimed in claim 9, further comprising the steps of:
    transmitting the printing request from the data processing apparatus for requesting the image forming apparatus to print electronic data;
    receiving, at the data processing apparatus, the first request or the second request from the image forming apparatus based on the printing request;
    converting, at the data processing apparatus, the electronic data into the printing data when receiving the first request;
    transmitting the electronic data from the data processing apparatus to the image forming apparatus when receiving the first request at the data processing apparatus; and
    transmitting the printing data from the data processing apparatus to the image forming apparatus when receiving the second request at the data processing apparatus.

11. A non-transitory computer-readable recording medium on which a program for causing an image forming apparatus connected to a network to perform a printing control method, the printing control method comprising the steps of: a) receiving a printing request from a data processing apparatus via the network, the printing request including a page description language list indicating at least one page description language applicable to the data processing apparatus; b) recording the printing request in a storage part of the image forming apparatus; c) determining whether the data processing apparatus is to convert electronic data associated to the printing request into printing data based on whether the list of page description languages includes a page description language processable by the image forming apparatus; d) transmitting a first request for transmitting the printing data to the data processing apparatus when the data processing apparatus is determined to convert the electronic data into the printing data; e) transmitting a second request for transmitting the electronic data to the data processing apparatus when the data processing apparatus is determined not to convert the electronic data into the printing data; f) receiving the printing data or the electronic data in response to the first and second request; and g) printing data received in step f).

12. The non-transitory computer-readable recording medium as claimed in claim 11, wherein the printing control method further comprises the steps of: transmitting the printing request from the data processing apparatus for requesting the image forming apparatus to print electronic data; receiving, at the data processing apparatus, the first request or the second request from the image forming apparatus based on the printing request; converting, at the data processing apparatus, the electronic data into the printing data when receiving the first request; transmitting the electronic data from the data processing apparatus to the image forming apparatus when receiving the first request at the data processing apparatus; and transmitting the printing data from the data processing apparatus to the image forming apparatus when receiving the second request at the data processing apparatus.

* * * * *